United States Patent
Matsuda et al.

(10) Patent No.: US 10,775,324 B2
(45) Date of Patent: Sep. 15, 2020

(54) SAMPLE HOLDER FOR AN X-RAY FLUORESCENCE SPECTROMETER, AND SAMPLE HOLDER MANUFACTURING JIG AND METHOD OF PRODUCING A SAMPLE FOR AN X-RAY FLUORESCENCE SPECTROMETER

(71) Applicant: RIGAKU CORPORATION, Tokyo (JP)

(72) Inventors: Wataru Matsuda, Takatsuki (JP); Minoru Inoue, Takatsuki (JP)

(73) Assignee: RIGAKU CORPORATION, Tokyo (JP)

( * ) Notice: Subject to any disclaimer, the term of this patent is extended or adjusted under 35 U.S.C. 154(b) by 88 days.

(21) Appl. No.: 16/328,178

(22) PCT Filed: Mar. 9, 2018

(86) PCT No.: PCT/JP2018/009189
§ 371 (c)(1),
(2) Date: Feb. 25, 2019

(87) PCT Pub. No.: WO2018/220935
PCT Pub. Date: Dec. 6, 2018

(65) Prior Publication Data
US 2019/0346384 A1 Nov. 14, 2019

(30) Foreign Application Priority Data

May 31, 2017 (JP) .................. 2017-108210
Aug. 22, 2017 (JP) .................. 2017-159592

(51) Int. Cl.
*G01N 23/223* (2006.01)
*G01N 23/20025* (2018.01)
*G01N 23/2204* (2018.01)

(52) U.S. Cl.
CPC ...... *G01N 23/223* (2013.01); *G01N 23/20025* (2013.01); *G01N 23/2204* (2013.01); *G01N 2223/076* (2013.01); *G01N 2223/637* (2013.01)

(58) Field of Classification Search
None
See application file for complete search history.

(56) References Cited

U.S. PATENT DOCUMENTS 4,974,244 A 11/1990 Torrisi et al.
9,683,951 B2 6/2017 Takeuchi
(Continued)

FOREIGN PATENT DOCUMENTS

CN 204249406 U 4/2015
CN 105891243 A 8/2016
(Continued)

OTHER PUBLICATIONS

International Search Report of PCT/JP2018/009189 dated Jun. 5, 2018.
(Continued)

*Primary Examiner* — Thomas R Artman
(74) *Attorney, Agent, or Firm* — HEA Law PLLC (57) ABSTRACT

Provided is a sample holder for an X-ray fluorescence spectrometer, which enables measurement of a liquid sample that is in a small amount and cannot be dropped and dried, when the measurement is performed with a tube-above optics X-ray fluorescence spectrometer. The sample holder for an X-ray fluorescence spectrometer includes: a first substrate including: a support substrate having a hole in which a liquid sample is placed; a first polymer film, which is bonded to a surface of the support substrate on an X-ray incident side so as to cover the hole; and an adhesive layer, which is provided on a back surface of the surface of the (Continued)

support substrate to which the first polymer film is bonded; and a second substrate including: a fixed substrate having a hole at a position corresponding to the hole of the support substrate; and a second polymer film, which is bonded to a surface of the fixed substrate on the X-ray incident side, the second substrate being bonded to the first substrate with the adhesive layer.

13 Claims, 11 Drawing Sheets

(56) References Cited

U.S. PATENT DOCUMENTS

| | | |
|---|---|---|
| 2010/0068100 A1 | 3/2010 | Voegelin et al. |
| 2014/0146940 A1 | 5/2014 | Zarkadas et al. |
| 2015/0003580 A1* | 1/2015 | Sarrazin ............. G01N 23/2204 378/44 |
| 2015/0226686 A1 | 8/2015 | Takeuchi |
| 2019/0346384 A1* | 11/2019 | Matsuda ............ G01N 23/2005 |

FOREIGN PATENT DOCUMENTS

| | | |
|---|---|---|
| CN | 106226254 A | 12/2016 |
| CN | 106483148 A | 3/2017 |
| CN | 109642881 A | 4/2019 |
| JP | 10-19812 | 1/1998 |
| JP | H 10-19812 A | 1/1998 |
| JP | 10-197459 | 7/1998 |
| JP | H 10-197459 A | 7/1998 |
| JP | 2000-266705 A | 9/2000 |
| JP | 2015-152388 A | 8/2015 |

OTHER PUBLICATIONS

Office Action dated Apr. 17, 2020, for corresponding CN Patent Application No. 201880003006.0 with partial translation.

* cited by examiner

SAMPLE HOLDER FOR AN X-RAY FLUORESCENCE SPECTROMETER, AND SAMPLE HOLDER MANUFACTURING JIG AND METHOD OF PRODUCING A SAMPLE FOR AN X-RAY FLUORESCENCE SPECTROMETER

CROSS-REFERENCE TO RELATED APPLICATIONS

This application is a 35 U.S.C. § 371 national stage application of PCT International Application No. PCT/JP2018/009189, filed Mar. 9, 2018, entitled "SAMPLE HOLDER FOR AN X-RAY FLUORESCENCE SPECTROMETER, AND SAMPLE HOLDER MANUFACTURING JIG AND METHOD OF PRODUCING A SAMPLE FOR AN X-RAY FLUORESCENCE SPECTROMETER," which claims the benefit of priority under 35 U.S.C. § 119 to Japanese Patent Application No. 2017-108210, filed May 31, 2017; and Japanese Patent Application No. 2017-159592, filed Aug. 22, 2017, the contents of which are incorporated herein by reference in their entirety.

TECHNICAL FIELD

The present invention relates to a sample holder for an X-ray fluorescence spectrometer, and a sample holder manufacturing jig, and a method of producing a sample for an X-ray fluorescence spectrometer.

BACKGROUND ART

There has been known an X-ray fluorescence spectrometer configured to irradiate a sample that is an object to be measured with an X-ray and detect an element contained in the sample based on output florescent X-rays. The object to be measured is not limited to a solid sample, and may be a liquid sample, that is, a sample having flowability.

For example, in Patent Literature 1, there is disclosed a sample having flowability and a measurement method. Specifically, according to the disclosure of Patent Literature 1, a sample having flowability is first filled into a recessed portion defined by a support substrate having a hole in a bottom surface and a polymer film stuck to the support substrate so as to close the hole. Then, a porous film is arranged so as to cover a surface of the filled sample.

Further, in a case in which an X-ray tube, a detector, and the like of the X-ray fluorescence spectrometer are arranged on a lower side of the sample, when a liquid sample is spilled from a measurement container during measurement, the spilled liquid sample causes a serious failure of the X-ray fluorescence spectrometer. Therefore, when the liquid sample is an object to be measured, a tube-above optics X-ray fluorescence spectrometer in which the X-ray tube, the detector, and the like are arranged on an upper side of the sample is used. For example, there has been known a method of filling a liquid sample into a container having an air bubble reservoir and analyzing the sample, in which air bubbles are prevented from being positioned on a measurement surface, through use of the tube-above optics X-ray fluorescence spectrometer.

Further, there has also been known a method of measuring a liquid sample after dropping and drying the liquid sample. For example, there has been known an X-ray fluorescence spectrometry in a state in which the liquid sample dropped onto filter paper is dried.

CITATION LIST

Patent Literature

[Patent Literature 1] JP 10-19812 A

SUMMARY OF INVENTION

Technical Problem

In the sample for measurement described in Patent Literature 1, the porous film is used. Therefore, when the filled sample has low viscosity or is volatile, the sample passes through pores of the porous film and cannot be measured.

Further, when the liquid sample is filled into the container having the air bubble reservoir, a sample having a volume larger than a certain volume is required in order to prevent air bubbles from being positioned on a measurement surface. Therefore, the X-ray fluorescence spectrometry through use of the above-mentioned container cannot be applied to the case in which the amount of the sample is small.

Further, the droplet method, in which droplet of the liquid on a filter paper is dried for measurement, cannot be applied to the case in which the liquid is made of a material that is not to be dried.

The present invention has been made in view of the above-mentioned problems, and an object of the present invention is to provide a sample holder for an X-ray fluorescence spectrometer and a method of producing a sample for an X-ray fluorescence spectrometer, which enable measurement of a liquid sample that is in a small amount and cannot be dropped and dried, when the measurement is performed with the tube-above optics X-ray fluorescence spectrometer.

Solution to Problem

A sample holder for an X-ray fluorescence spectrometer according to claim 1 includes: a first substrate including: a support substrate having a hole in which a liquid sample is placed; a first polymer film, which is bonded to a surface of the support substrate on an X-ray incident side so as to cover the hole; and an adhesive layer, which is provided on a back surface of the surface of the support substrate to which the first polymer film is bonded; and a second substrate including: a fixed substrate having a hole at a position corresponding to the hole of the support substrate; and a second polymer film, which is bonded to a surface of the fixed substrate on the X-ray incident side, the second substrate being bonded to the first substrate with the adhesive layer.

According to a sample holder of claim. 2, in the sample holder according to claim 1, the fixed substrate has flexibility.

According to a sample holder of claim 3, in the sample holder according to claim 2, the fixed substrate is thinner than the support substrate.

According to a sample holder of claim 4, in the sample holder according to anyone of claims 1 to 3, the adhesive layer configured to bond the first substrate and the second substrate to each other is formed of a laminate including a bonding agent, a third polymer film, and the bonding agent.

According to a sample holder of claim 5, in the sample holder according to any one of claims 1 to 4, the X-ray fluorescence spectrometer is a tube-above optics X-ray fluorescence spectrometer.

According to a sample holder of claim 6, in the sample holder according to any one of claims 1 to 5, the support substrate and the fixed substrate have different colors.

According to a sample holder of claim 7, in the sample holder according to any one of claims 1 to 6, the first polymer film and the second polymer film are each made of polypropylene, polyester, or polyimide.

According to a sample holder of claim 8, in the sample holder according to any one of claims 1 to 7, the third polymer film is made of a foam.

A sample holder manufacturing jig according to claim 9, which is configured to manufacture the sample holder for an X-ray fluorescence spectrometer of any one of claims 1 to 8, includes: a flat plate portion, which has an outer shape in plan view conforming to a part of an outer shape of the first substrate, and on which the first substrate is mounted; and a guide portion, which is configured to fix the first substrate, and is arranged so as to extend along an edge of a part corresponding to the outer shape and stand with respect to a surface of the flat plate portion on which the first substrate is mounted.

According to a sample holder manufacturing jig of claim 10, in the sample holder manufacturing jig according to claim 9, the flat plate portion includes an indicator for indicating an outer edge of the hole of the support substrate.

According to a sample holder manufacturing jig of claim 11, in the sample holder manufacturing jig according to claim 9 or 10, the sample holder manufacturing jig is made of polyethylene terephthalate.

A method of producing a sample for an X-ray fluorescence spectrometer according to claim 12 includes: dropping a liquid sample onto a recessed portion defined by a hole and a first polymer film with respect to a first substrate, the first substrate including a support substrate having the hole, the first polymer film that is bonded to a surface of the support substrate on an X-ray incident side so as to cover the hole, and an adhesive layer which is provided on a back surface of the surface of the support substrate to which the first polymer film is bonded; and bonding a second substrate to the first substrate with the adhesive layer, the second substrate including a fixed substrate having a hole at a position corresponding to the hole of the support substrate and a second polymer film that is bonded to a surface of the fixed substrate on the X-ray incident side.

According to a method of producing a sample for an X-ray fluorescence spectrometer of claim 13, the method of producing a sample for an X-ray fluorescence spectrometer according to claim 12 further includes mounting the first substrate on a sample holder manufacturing jig, the sample holder manufacturing jig including: a flat plate portion, which has an outer shape in plan view conforming to a part of an outer shape of the first substrate, and on which the first substrate is mounted; and a guide portion, which is configured to fix the first substrate, and is arranged so as to extend along an edge of a part corresponding to the outer shape and stand with respect to a surface of the flat plate portion on which the first substrate is mounted.

Advantageous Effects of Invention

According to the invention described in claims 1 and 5 to 12, the liquid sample that is in a small amount and cannot be dropped and dried can be measured with the tube-above optics X-ray fluorescence spectrometer.

Further, according to the invention described in claims 2 and 3, the amount of air bubbles to be mixed can be reduced when the sample is filled into the sample holder.

Further, according to the invention described in claim 4, the filled liquid sample can be prevented from exuding to the outside of the sample holder.

Further, according to the invention described in claims 9 to 11 and 13, the manufacturing accuracy of the sample holder can be improved.

DESCRIPTION OF EMBODIMENT

Figure 1:
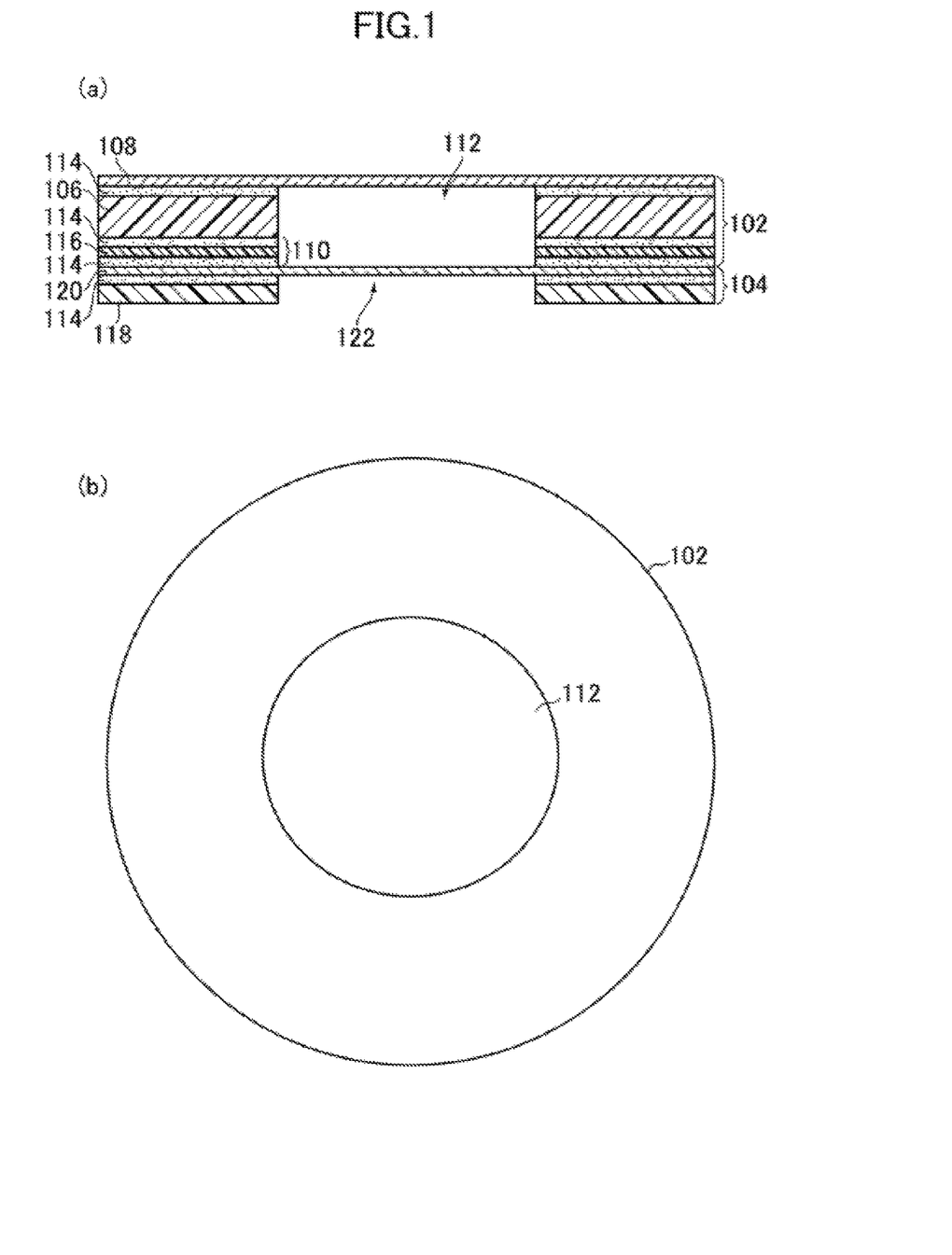
FIG. 1 are each a view for schematically illustrating a sample holder according to an embodiment of the present invention.

Now, an exemplary embodiment (hereinafter referred to as "embodiment") for carrying out the present invention will be described. FIG. 1 is a view for schematically illustrating a sample holder 100 according to the present invention. FIG. 1(a) is a view for illustrating a cross section of the sample holder 100, and FIG. 1(b) is a view of the sample holder 100 when viewed from an upper side.

As illustrated in FIG. 1, the sample holder 100 includes a first substrate 102 and a second substrate 104. The first substrate 102 includes a support substrate 106, a first polymer film 108, an adhesive layer 110, and a bonding agent 114.

For example, as illustrated in FIG. 1(b), the support substrate 106 is a disc-shaped substrate having a diameter of 50 mm and has a circular hole 112 having a diameter of 32 mm in a center portion. A liquid sample 200 is placed in a recessed portion defined by the hole 112 of the support substrate 106 and the first polymer film 108 that is bonded to the support substrate 106. The support substrate 106 is made of, for example, polycarbonate, polypropylene, or polyethylene terephthalate having a thickness of from 0.5 mm to 2 mm.

The first polymer film 108 is bonded to a surface of the support substrate 106 on an X-ray incident side so as to cover the hole 112. Specifically, the first polymer film 108 is bonded to the surface of the support substrate 106 on the X-ray incident side so as to close the hole 112 formed in the support substrate 106 through use of the bonding agent 114. It is desired that the bonding agent 114 be formed so as to have the same configuration as that of the adhesive layer 110.

Further, the first polymer film 108 is made of a thin resin which has high X-ray transmissivity, and airtightness and liquid-tightness, and has a thickness of from 0.1 μm to 25 μm. Specifically, the first polymer film 108 is made of, for example, polypropylene, polyester, or polyimide having a thickness of 6 μm. When the first polymer film 108 has airtightness and liquid-tightness, measurement can be performed with an X-ray fluorescence spectrometer 1300 in a state in which the liquid sample is sealed. Further, when the first polymer film 108 is made of a thin resin, measurement can be performed with high sensitivity and high accuracy while the influence of a scattered ray included in the measurement results obtained by the X-ray fluorescence spectrometer 1300 is reduced.

Further, the first polymer film 108 is made of a resin having transparency. When the first polymer film 108 is transparent or semitransparent, it can be visually recognized from outside whether or not air bubbles have been mixed into the liquid sample 200.

The adhesive layer 110 is formed of a laminate including the bonding agent 114, a third polymer film 116, and the bonding agent 114, and is configured to bond the first substrate 102 and the second substrate 104 to each other. Specifically, the adhesive layer 110 is, for example, a double-sided tape having the bonding agent 114 applied to each of a front surface and a back surface of a core material. The third polymer film 116 that is the core material is made of, for example, a foam such as polyolefin having a foaming property for suppressing permeation of the liquid sample 200. As a result, the liquid sample 200 can be prevented from exuding from an interface between the first substrate 102 and the second substrate 104 after the first substrate 102 and the second substrate 104 are stuck to each other.

In a state before the first substrate 102 and the second substrate 104 are to be stuck to each other, the adhesive layer 110 has release paper placed thereon for protecting the surface of the bonding agent 114. The release paper is peeled off before the first substrate 102 and the second substrate 104 are stuck to each other.

The second substrate 104 includes a fixed substrate 118, a second polymer film 120, and the bonding agent 114. The fixed substrate 118 has a hole 122 at a position corresponding to the hole 112 of the support substrate 106. Specifically, for example, as illustrated in FIG. 1(b), the fixed substrate 118 is a disc-shaped substrate having a diameter of 50 mm and has the circular hole 122 having a diameter of 32 mm in a center portion, in the same manner as in the support substrate 106. As illustrated in FIG. 1(a), it is desired that the position and size of the hole 112 formed in the support substrate 106 be matched with those of the hole 122 formed in the fixed substrate 118 after the first substrate 102 and the second substrate 104 are stuck to each other.

The fixed substrate 118 has flexibility. Specifically, the fixed substrate 118 may be made of, for example, polycarbonate, polypropylene, or polyethylene terephthalate having high flexibility and a thickness of from 0.5 mm to 1.5 mm, or may be made of a material having flexibility higher than that of those materials. The fixed substrate 118 may be formed to be thinner than the support substrate 106 so as to have high flexibility. Specifically, for example, the fixed substrate 118 has a thickness of 0.5 mm, and the support substrate 106 has a thickness of 0.8 mm.

The support substrate 106 and the fixed substrate 118 are formed in different colors. Specifically, for example, the support substrate 106 is formed white while the fixed substrate 118 is formed black. When the support substrate 106 and the fixed substrate 118 are formed in different colors, a measurement surface can be easily identified.

The second polymer film 120 is bonded to a surface of the fixed substrate 118 on the X-ray incident side. Specifically, the second polymer film 120 is bonded to the surface of the fixed substrate 118 on the X-ray incident side with an adhesive so as to close the hole 122 formed in the fixed substrate 118.

Further, the second polymer film 120 is made of a thin resin which has airtightness and liquid-tightness and has a thickness of from 0.1 μm to 25 μm. Specifically, the second polymer film 120 is made of polypropylene, polyester, or polyimide having a thickness of 6 μm, in the same manner as in the first polymer film 108. When the second polymer film 12 has airtightness and liquid-tightness, measurement can be performed with the X-ray fluorescence spectrometer 1300 in a state in which the liquid sample is sealed. Further, when the second polymer film 120 is made of a thin resin, measurement can be performed with high accuracy while the influence of a scattered ray included in the measurement results obtained by the X-ray fluorescence spectrometer 1300 is reduced.

The second polymer film 120 is stuck to the first substrate 102 so as to cover an opening surface of the recessed portion defined by the support substrate 106 and the first polymer film 108. In this way, the second polymer film 120 seals the liquid sample 200 filled in the recessed portion.

The bonding agent 114 provided on the second substrate 104 is configured to stick the fixed substrate 118 and the second polymer film 120 to each other. FIG. 1 are each a view for illustrating a configuration in which only the bonding agent 114 is provided between the fixed substrate 118 and the second polymer film 120. However, it is more desired that a configuration in which the bonding agent 114, the third polymer film 116, and the bonding agent 114 are laminated in the same manner as in the adhesive layer 110 be provided between the fixed substrate 118 and the second polymer film 120.

Figure 2:
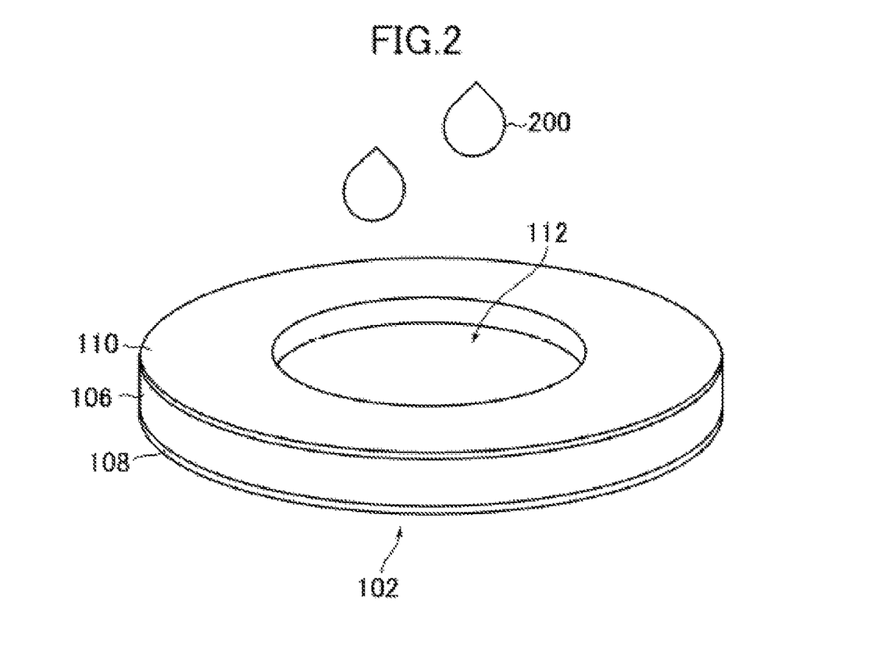
FIG. 2 is a view for illustrating a step of filling a sample into the sample holder.
Figure 3:
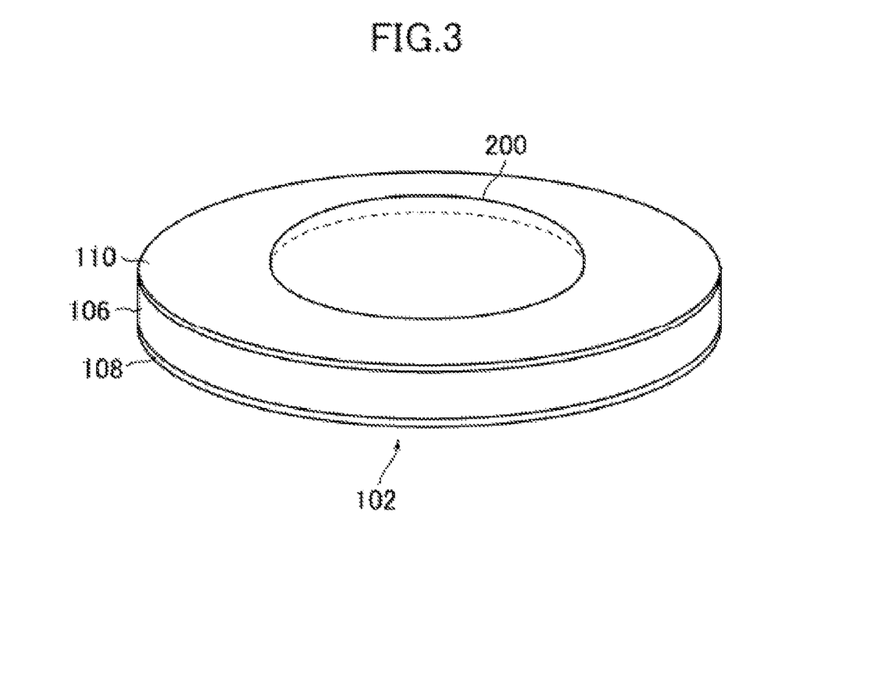
FIG. 3 is a view for illustrating the step of filling the sample into the sample holder.

Next, a method of producing a sample for the X-ray fluorescence spectrometer 1300 by filling the liquid sample 200 into the sample holder 100 will be described. FIG. 2 and FIG. 3 are each a view for illustrating a step of dropping the liquid sample 200 onto the recessed portion defined by the hole 112 and the first polymer film 108 of the first substrate 102. The first substrate 102 includes the support substrate 106 having the hole 112, the first polymer film 108 that is bonded to the surface of the support substrate 106 on the X-ray incident side so as to cover the hole 112, and the adhesive layer 110.

Specifically, first, as illustrated in FIG. 2, the first substrate 102 is placed on a clean and flat surface in a state in which the first polymer film 108 of the first substrate 102 is directed downward. Then, the liquid sample 200 that is an object to be measured is dropped onto the recessed portion. For example, when the recessed portion has a diameter of 32 mm, and the support substrate 106 has a thickness of 0.8 mm, a sample of about 1 mL is dropped.

FIG. 3 is a view for illustrating the first substrate 102 after the liquid sample 200 is dropped. As illustrated in FIG. 3, the sample is dropped so that the surface of the sample is positioned slightly higher than the surface of the adhesive layer 110 provided on the first substrate 102 due to surface tension. Although not shown in FIG. 3, the release paper placed on the surface of the adhesive layer 110 is peeled off so that the bonding agent 114 is exposed.

It is desired that, in order to prevent the dropped sample 200 from spilling, the release paper be peeled off before the sample is dropped. Further, a mass of the filled sample 200 is calculated by measuring in advance masses of the support substrate 106 having the release paper peeled off therefrom and the fixed substrate 118, and subtracting the measured masses from the mass of the sample holder 100 filled with the sample 200. The result of calculation can be used for correction of X-ray fluorescence analysis.

Figure 4:
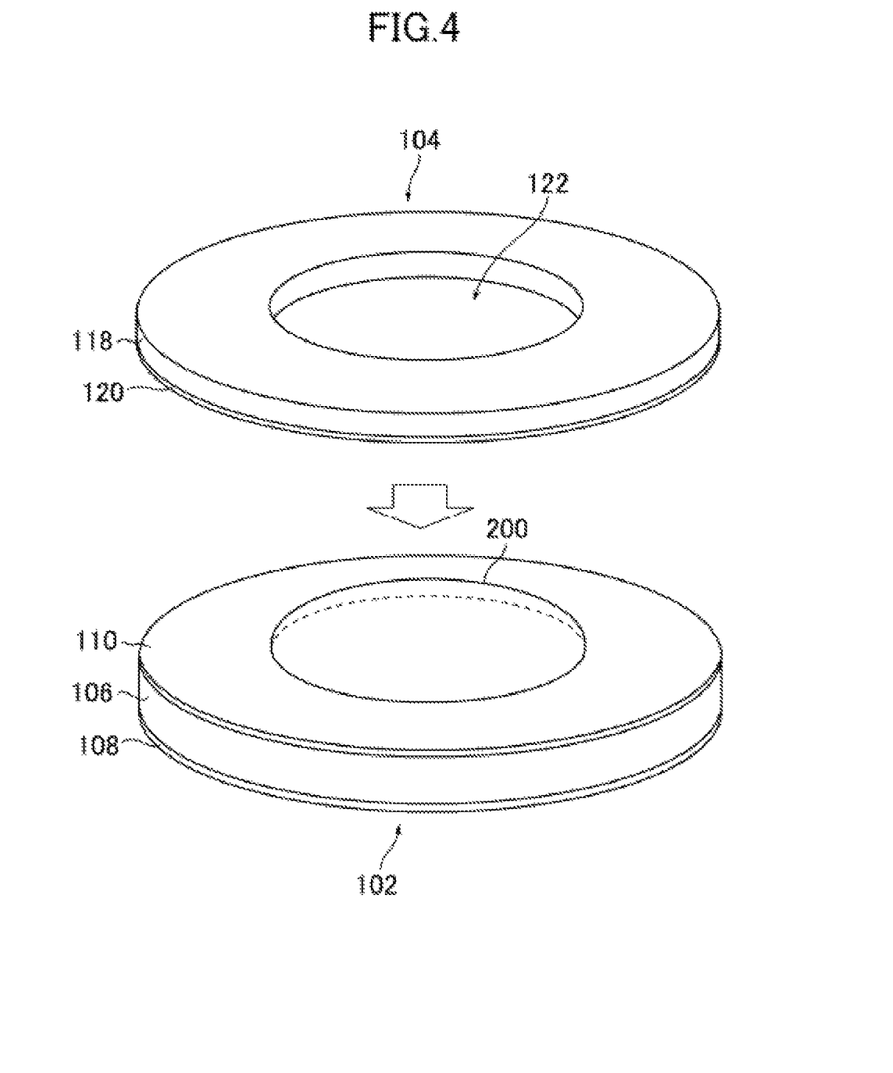
FIG. 4 is a view for illustrating the step of filling the sample into the sample holder.
Figure 5:
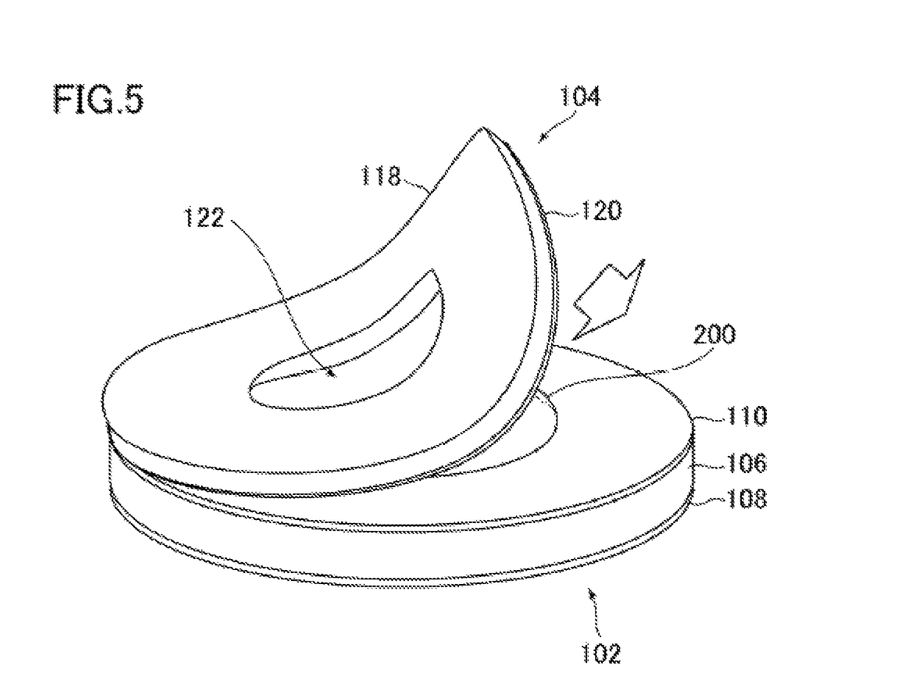
FIG. 5 is a view for illustrating the step of filling the sample into the sample holder.
Figure 6:
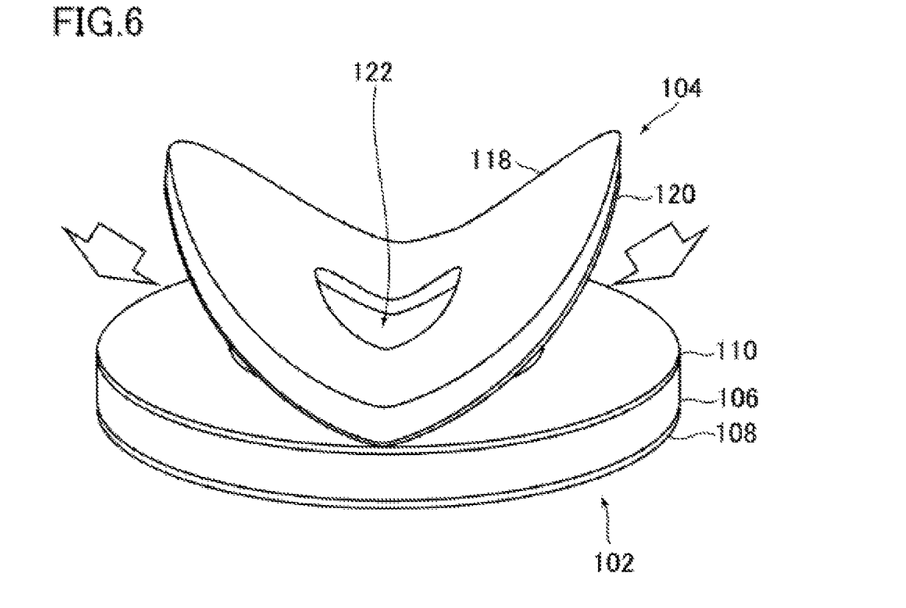
FIG. 6 is a view for illustrating the step of filling the sample into the sample holder.

FIG. 4 to FIG. 6 are each a view for illustrating a step of sticking the second substrate 104 to the first substrate 102 with the adhesive layer 110. The second substrate 104 includes the fixed substrate 118 having the hole 122 at the position corresponding to the hole 112 of the support substrate 106 and the second polymer film 120 that is bonded to the surface of the fixed substrate 118 on the X-ray incident side.

As illustrated in FIG. 4, the second substrate 104 is stuck to the first substrate 102 having the sample dropped thereon in a state in which a surface having the second polymer film 120 bonded thereto is directed to the first substrate 102. The fixed substrate 118 has flexibility. Therefore, as illustrated in FIG. 5, the second substrate 104 is bent into a bow shape so as to form a surface protruding toward the first substrate 102, and the edge of the second substrate 104 is aligned with the edge of the first substrate 102. After that, the second substrate 104 is gradually stuck to the first substrate 102. In such a manner, air bubbles to be mixed into the sample can be reduced.

Further, the following method may also be employed. As illustrated in FIG. 6, both ends of the second substrate 104 are bent into a bow shape so as to form a surface protruding toward the first substrate 102, and a center portion of the liquid sample 200 positioned slightly higher than the surface of the adhesive layer 110 is brought into contact with a center portion of the second polymer film 120. From this state, the second substrate 104 is gradually stuck to the first substrate 102 from the vicinity of a center line corresponding to a diameter, to both the ends. In such a manner, air bubbles to be mixed into the sample can be reduced.

The second polymer film 120 is made of a resin having transparency. When the second polymer film 120 is transparent or semitransparent, the first substrate 102 and the second substrate 104 can be stuck to each other while being visually recognized so that the air bubbles are prevented from being mixed into the liquid sample 200.

Figure 7:
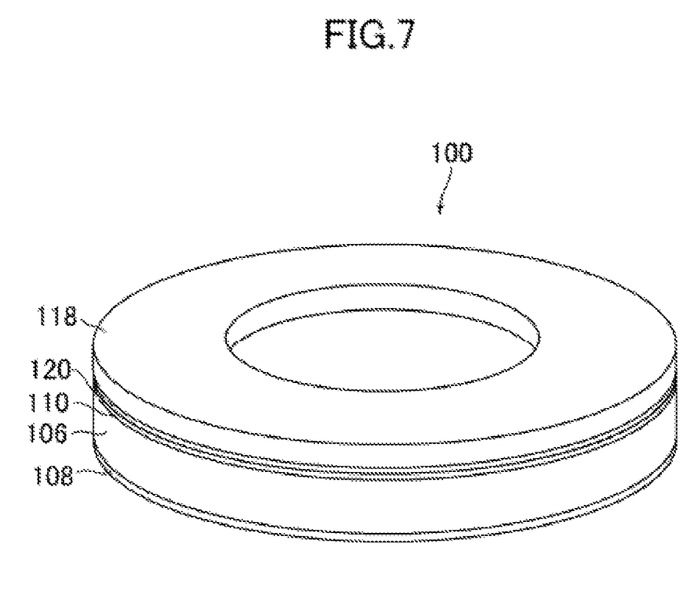
FIG. 7 is a view for illustrating the step of filling the sample into the sample holder.

FIG. 7 is a view for illustrating the sample holder 100 in a state in which the first substrate 102 and the second substrate 104 are stuck to each other after the sample is filled. The first substrate 102 and the second substrate 104 are stuck to each other in a state in which the first substrate 102 is placed on a flat surface. Therefore, the first polymer film 108 is in a state of being stretched flat even when the sample is filled.

Figure 8:
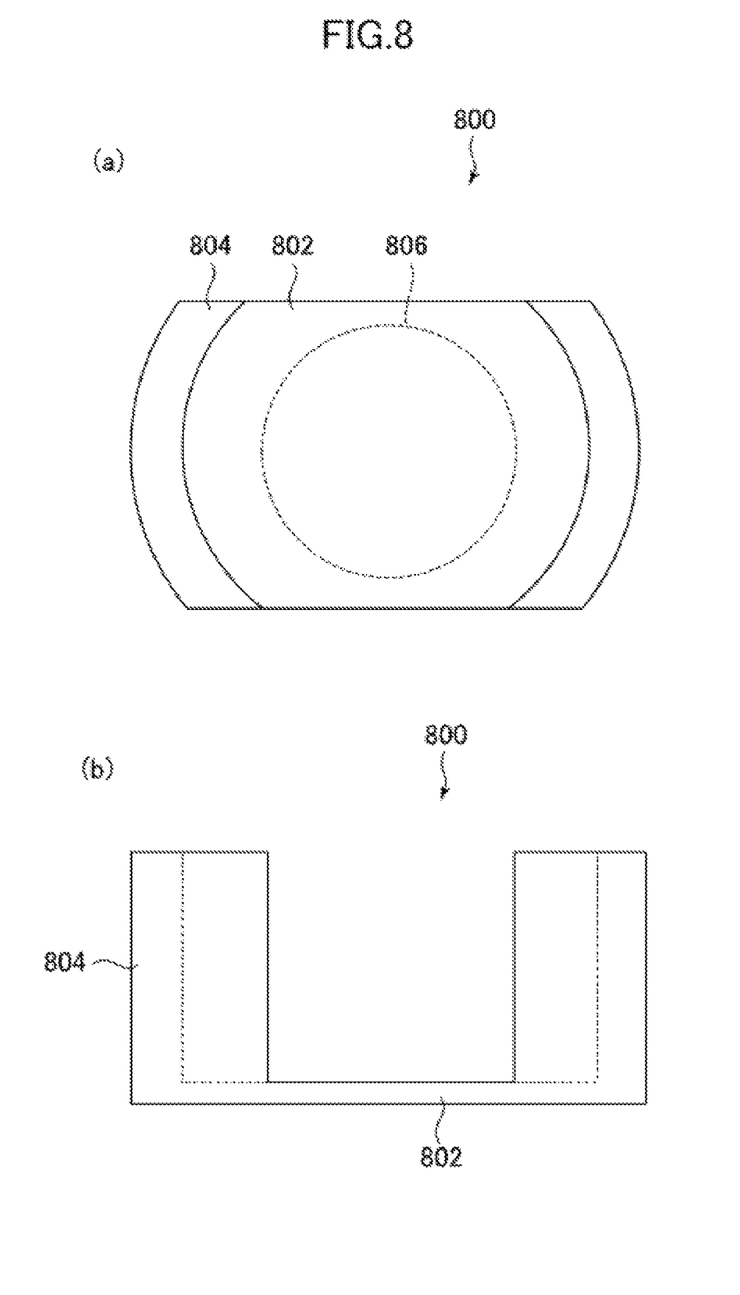
FIG. 8 are each a view for schematically illustrating a sample holder manufacturing jig.

Next, a sample holder manufacturing jig 800 configured to manufacture the sample holder 100 will be described. FIG. 8(*a*) is a view of the sample holder manufacturing jig 800 when viewed from an upper surface, and FIG. 8(*b*) is a view of the sample holder manufacturing jig 800 when viewed from a side surface. The sample holder manufacturing jig 800 includes a flat plate portion 802 and a guide portion 804.

The flat plate portion 802 has an outer shape in plan view conforming to a part of an outer shape of the first substrate 102, and the first substrate 102 is mounted on the flat plate portion 802. Specifically, the flat plate portion 802 has an outer shape in plan view obtained by cutting out a part of the first substrate 102 having a circular outer shape. For example, as illustrated in FIG. 8(*a*), the flat plate portion 802 has a shape obtained by cutting out a region on an upper side and a region on a lower side which are separated by the same distance from the center of the first substrate 102 on the drawing sheet. Further, the first substrate 102 is mounted on the flat plate portion 802 so that the surface of the first substrate 102 having the first polymer film 108 provided thereon is brought into contact with the flat plate portion 802, as will be described later.

The flat plate portion 802 may include an indicator 806 for indicating an outer edge of the hole 112 of the support substrate 106. Specifically, the indicator 806, such as a scribe line or a pattern, may be formed at a position corresponding to the outer edge of the hole 112 of the support substrate 106. In this way, when the first substrate 102 is mounted on the flat plate portion 802, a region corresponding to the hole 112 is made clear.

The guide portion 804 is configured to fix the first substrate 102, and is arranged so as to extend along an edge of a part corresponding to the outer shape and stand with respect to a surface of the flat plate portion 802 on which the first substrate 102 is mounted. Specifically, as illustrated in FIG. 8(*a*), the guide portion 804 is formed so as to extend along an edge of an arc-shaped portion of the flat plate portion 802 and be perpendicular to the surface of the flat plate portion 802 on which the first substrate 102 is mounted. In order for the guide portion 804 to fix the first substrate 102 when the first substrate 102 is mounted on the flat plate portion 802, it is desired that a clearance between an inner side surface of the guide portion 804 and an outer side surface of the first substrate 102 fall within 1 mm.

Next, a method of manufacturing the sample holder 100 through use of the sample holder manufacturing jig 800 will be described. FIG. 9 to FIG. 12 are each a view for illustrating a step of filling the sample 200 into the sample holder 100 through use of the sample holder manufacturing jig 800.

Figure 9:
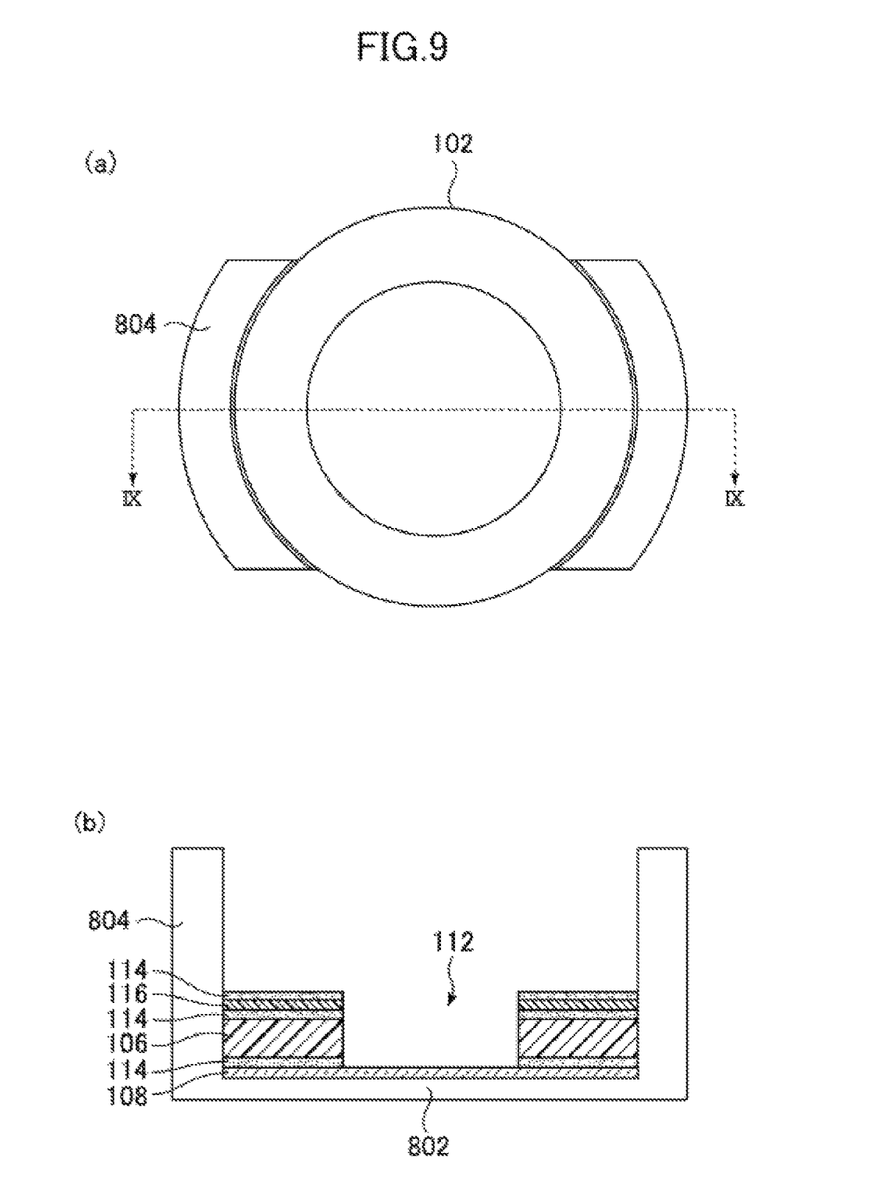
FIG. 9 are each a view for illustrating a step of filling the sample into the sample holder through use of the sample holder manufacturing jig.
Figure 10:
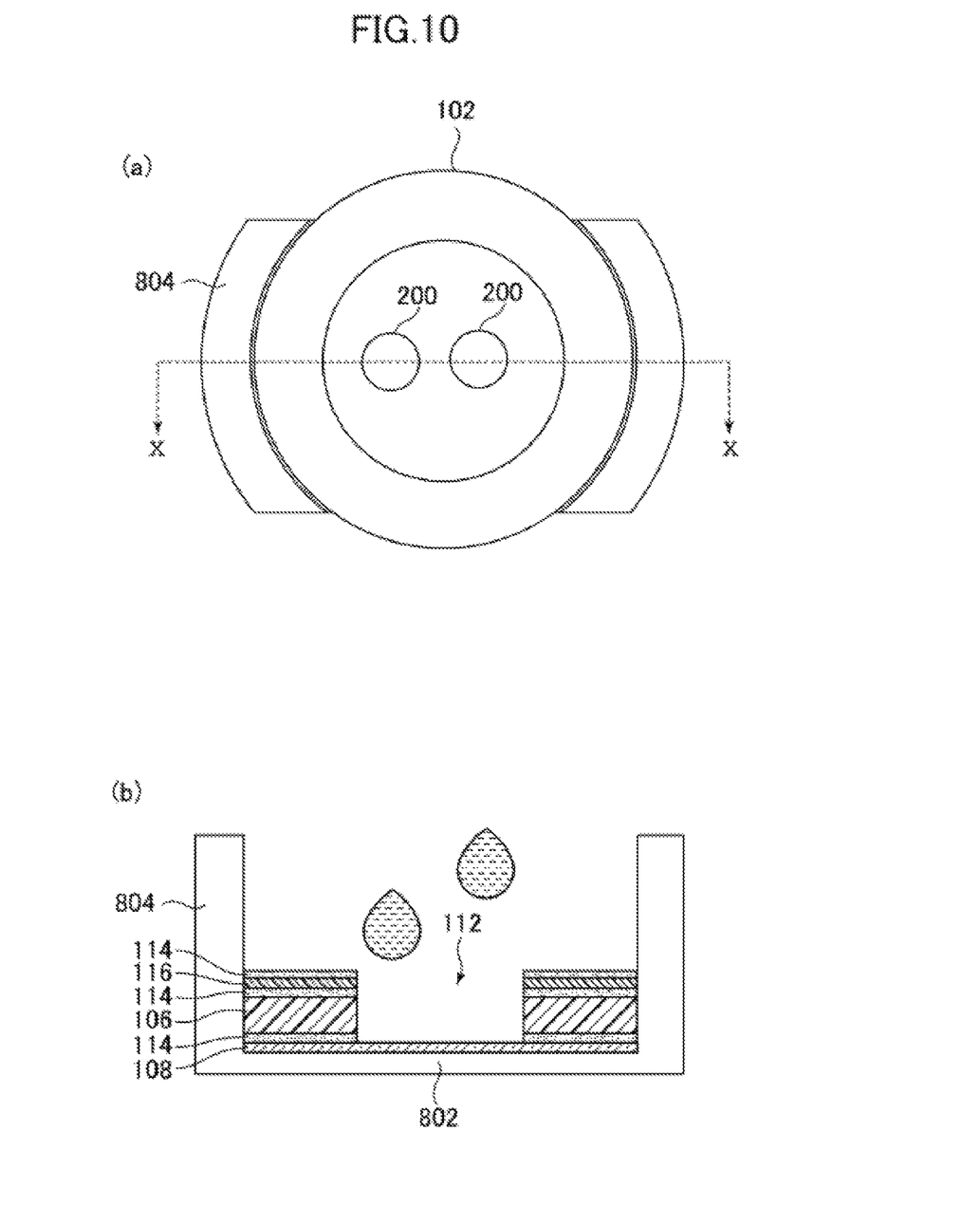
FIG. 10 are each a view for illustrating the step of filling the sample into the sample holder through use of the sample holder manufacturing jig.
Figure 11:
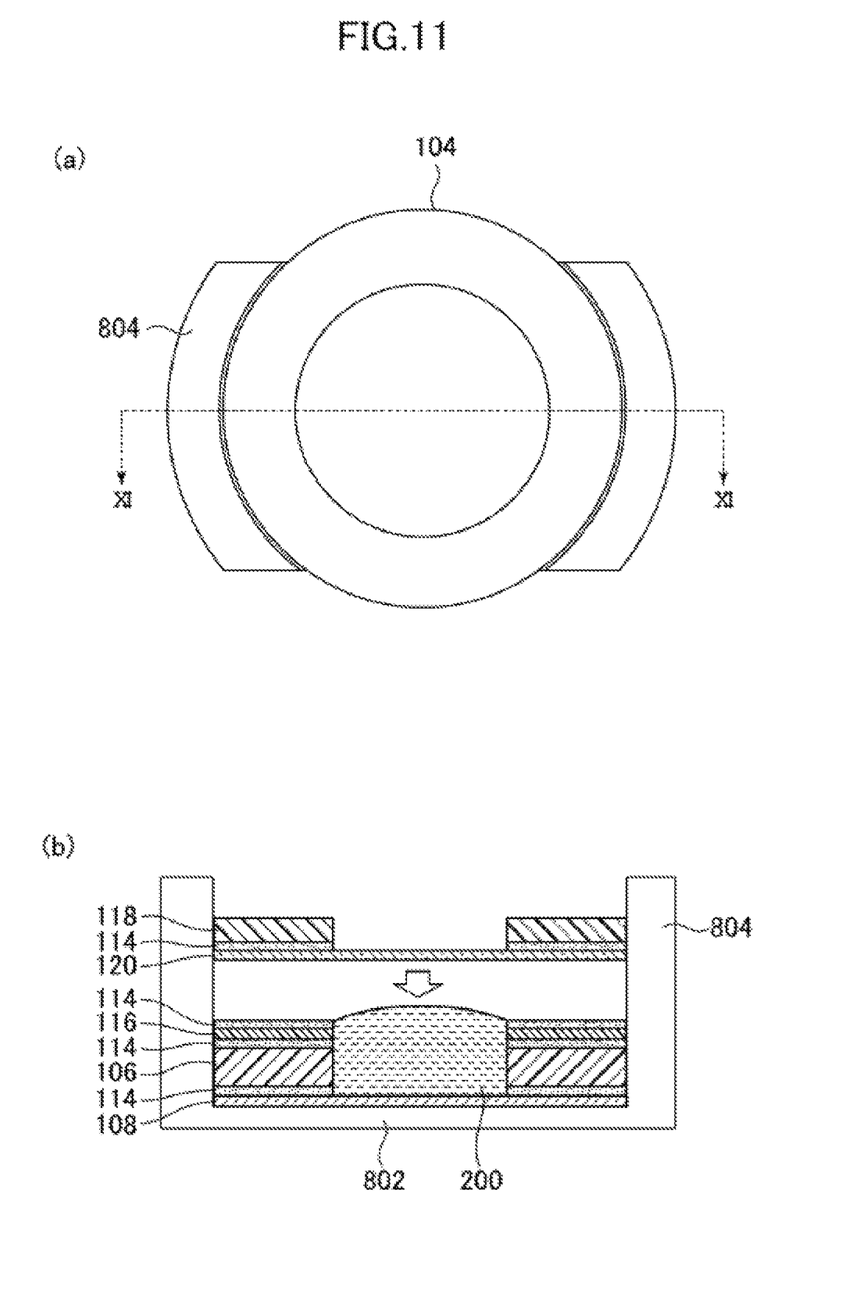
FIG. 11 are each a view for illustrating the step of filling the sample into the sample holder through use of the sample holder manufacturing jig.
Figure 12:
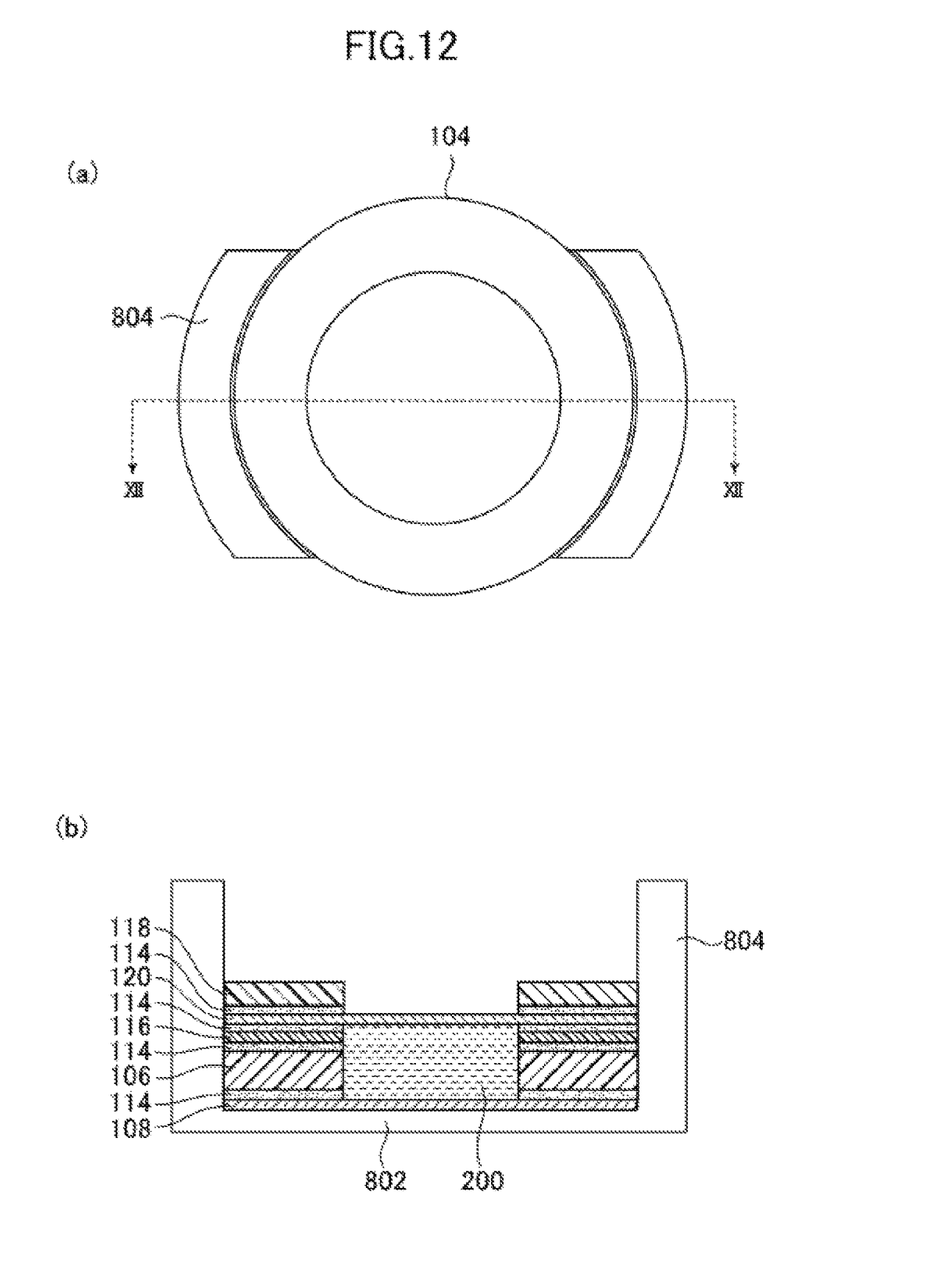
FIG. 12 are each a view for illustrating the step of filling the sample into the sample holder through use of the sample holder manufacturing jig.

First, the surface of the flat plate portion 802 on which the first substrate 102 is mounted is cleaned. With the cleaned surface of the flat plate portion 802, impurities can be prevented from adhering to the sample holder 100 when X-ray fluorescence analysis, described later, is performed. The flat plate portion 802 includes the indicator 806, and hence a position corresponding to a region into which the sample 200 that is an object to be measured is filled is made clear. Thus, degradation in measurement accuracy caused by the adhesion of the impurities can be prevented by cleaning an inner side of the indicator 806.

Next, as illustrated in FIG. 9(*a*), the first substrate 102 is mounted on the surface of the flat plate portion 802 having the guide portion 804 formed thereon. As a result, the first substrate 102 is fixed by the guide portion 804. FIG. 9(*b*) is a view for illustrating a cross section taken along the line IX-IX of FIG. 9(*a*). As illustrated in FIG. 9(*b*), the first substrate 102 is mounted so that the first polymer film 108 is brought into contact with the flat plate portion 802. FIG. 9(*b*) is a view for illustrating a state in which the release paper placed on the surface of the adhesive layer 110 is peeled off so that the bonding agent 114 is exposed.

Next, as illustrated in FIG. 10(a) and FIG. 10(b), the liquid sample 200 that is an object to be measured is dropped onto the recessed portion. The method of dropping the sample 200 is the same as that illustrated in FIG. 2. FIG. 10(b) is a view for illustrating a cross section taken along the line X-X of FIG. 10(a).

Next, as illustrated in FIG. 11(a) and FIG. 11(b), the second substrate 104 is stuck to the first substrate 102. FIG. 11(b) is a view for illustrating a cross section taken along the line XI-XI of FIG. 11(a). Specifically, as illustrated in FIG. 11(b), in a state in which the sample 200 is dropped, the surface of the sample 200 is positioned slightly higher than the surface of the adhesive layer provided on the first substrate 102 due to surface tension. The second substrate 104 is stuck to the first substrate 102 having the sample dropped thereon so that the surface having the second polymer film 120 bonded thereto is directed to the first substrate 102. In this case, the first substrate 102 and the second substrate 104 have the same outer shape in plan view. Because of this, the first substrate 102 and the second substrate 104 are stuck to each other by the guide portion 804 so that the respective centers are aligned with each other.

In order to prevent air bubbles from being mixed into the sample 200, the second substrate 104 may be stuck to the first substrate 102 in the same manner as in the method illustrated in FIG. 5. That is, the second substrate 104 is bent into a bow shape so as to form a surface protruding toward the first substrate 102, and the respective edges are aligned with each other. Further, the following method may also be employed. In the same manner as in the method illustrated in FIG. 6, both ends of the second substrate 104 are bent into a bow shape so as to form a surface protruding toward the first substrate 102, and a center portion of the liquid sample 200 positioned slightly higher than the surface of the adhesive layer is brought into contact with a center portion of the second polymer film 120. From this state, the second substrate 104 is gradually stuck to the first substrate 102 from the vicinity of a center line corresponding to a diameter to both the ends.

FIG. 12(a) and FIG. 12(b) are each a view for illustrating the sample holder 100 in a state in which the first substrate 102 and the second substrate 104 are stuck to each other after the sample 200 is filled. FIG. 12(b) is a view for illustrating a cross section taken along the line XII-XII of FIG. 12(a). As illustrated in FIG. 12(b), the first substrate 102 and the second substrate 104 are stuck to each other so that the respective centers are aligned with each other. In this way, when the sample holder 100 is mounted on the X-ray fluorescence spectrometer 1300, the situation in which the sample holder 100 is not fitted with a sample stage 1302 of the X-ray analyzer can be prevented. For example, when a recessed portion on which the sample holder 100 is mounted is formed in the sample stage 1302, the situation in which the sample holder 100 is not fitted with the recessed portion can be prevented.

Next, an X-ray fluorescence spectrometry through use of the sample holder 100 will be described with reference to FIG. 13. The X-ray fluorescence spectrometer 1300 is the tube-above optics X-ray fluorescence spectrometer 1300. However, the X-ray fluorescence spectrometer 1300 itself is the same as that in the related art, and hence detailed description thereof is omitted.

Figure 13:
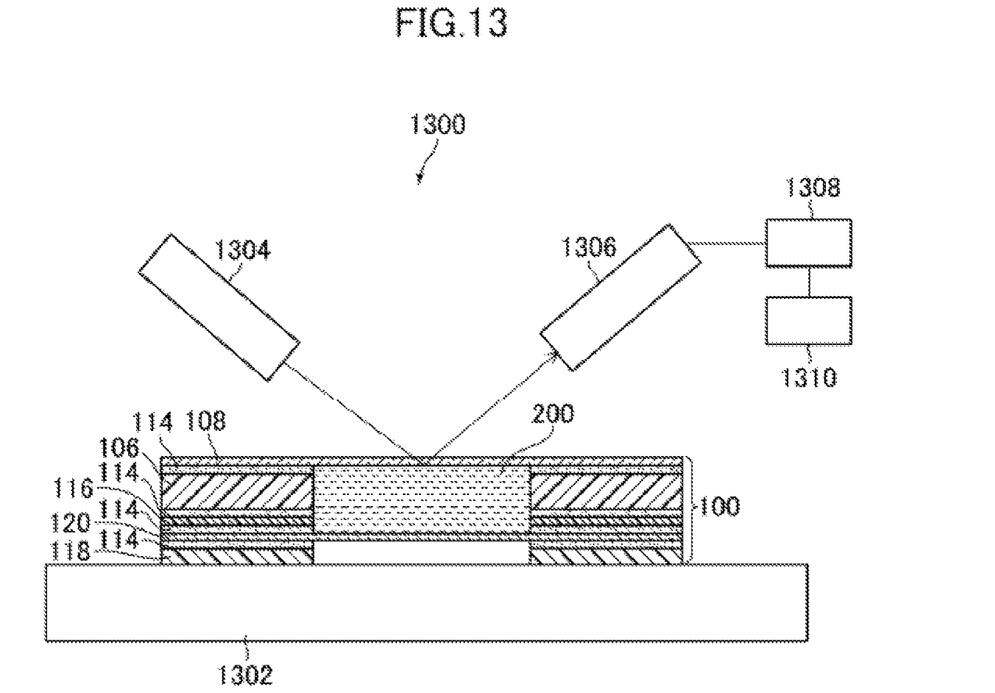
FIG. 13 is an explanatory view for illustrating a method of measurement through use of an X-ray fluorescence spectrometer.

As illustrated in FIG. 13, the X-ray fluorescence spectrometer 1300 includes the sample stage 1302, an X-ray source 1304, a detector 1306, a counter 1308, and an analysis unit 1310. A sample that is an object to be measured is placed on the sample stage 1302. Specifically, as illustrated in FIG. 13, the sample holder 100 having the liquid sample 200 filled therein is mounted on the sample stage 1302 with the first polymer film 108 bonded to the first substrate 102 being directed upward.

The X-ray source 1304 is configured to irradiate the surface of the sample holder 100 with primary X-rays that generates florescent X-rays. Specifically, the X-ray source 1304 is configured to irradiate a center portion of the first polymer film 108 of the sample holder 100 with the primary X-rays. The liquid sample 200 irradiated with primary X-rays emits the secondary X-rays.

There is a risk that the sample holder 100, which has the liquid sample 200 filled therein and is sealed with the thin first polymer film 108 and second polymer film 120, may rupture in a vacuum. Thus, measurement is performed under a normal pressure. When a light element is analyzed, measurement is performed under a helium purge so as to reduce X-ray absorption in an optical path of an optical system.

The detector 1306 is a detector 1306 such as an SDD. The detector 1306 is configured to measure a secondary X-ray intensity and output a pulse signal having a wave height value corresponding to the energy of the measured secondary X-rays.

The counter 1308 is configured to count a pulse signal output as a measurement intensity of the detector 1306 in accordance with the wave height value. Specifically, the counter 1308 is, for example, a multi-channel analyzer, which is configured to count an output pulse signal of the detector 1306 for each channel corresponding to the energy of the secondary X-rays and output the output pulse signal as a secondary X-ray intensity. When the secondary X-rays is dispersed, the counter 1308 configured to obtain an output of the detector 1306 configured to measure the dispersed secondary X-rays may be a single-channel analyzer, which is configured to count a pulse signal only within a wave height value range corresponding to the dispersed energy.

The analysis unit 1310 is configured to perform quantitative analysis of an element contained in the sample based on the count results of the counter 1308. Specifically, for example, the analysis unit 1310 is configured to perform quantitative analysis by a calibration curve method or a fundamental parameter (FP) method through use of the count results of the counter 1308.

As described above, according to the present invention, the liquid sample 200, which is in a small amount and cannot be dropped and dried, can be measured by the tube-above optics X-ray fluorescence spectrometer 1300. Further, measurement can be performed with high sensitivity and satisfactory accuracy by reducing air bubbles mixed into the sample and using the thin first polymer film 108.

The present invention is not limited to the above-mentioned embodiment and can be variously modified. The configuration of the X-ray fluorescence spectrometer 1300 is one example, and the present invention is not limited thereto. This configuration may be replaced by a configuration that is substantially the same as the configuration described in the embodiment, a configuration that exhibits the same action and effect as those of the configuration described in the embodiment, or a configuration that achieves the same object as that of the configuration described in the embodiment. Further, measurement can also be performed through use of a lower surface irradiation type X-ray fluorescence spectrometer in which the sample holder 100 according to the present invention is mounted so that the first polymer film 108 is placed on a lower side, and an X-ray tube, a detector, and the like are arranged on a lower side of the sample.

REFERENCE SIGNS LIST 100 sample holder, 102 first substrate, 104 second substrate, 106 support substrate, 108 first polymer film, 110 adhesive layer, 112 hole of support substrate, 114 bonding agent, 116 third polymer film, 118 fixed substrate, 120 second polymer film, 122 hole of fixed substrate, 200 liquid sample, 800 sample holder manufacturing jig, 802 flat plate portion, 804 guide portion, 806 indicator, 1300 X-ray fluorescence spectrometer, 1302 sample stage, 1304 X-ray source, 1306 detector, 1308 counter, 1310 analysis unit

What is claimed is:

1. A sample holder for an X-ray fluorescence spectrometer, comprising:
 a first substrate including:
  a support substrate having a first hole in which a liquid sample is placed;
  a first polymer film, which is bonded to a surface of the support substrate on an X-ray incident side so as to cover the first hole; and
  an adhesive layer, which is provided on a back surface of the surface of the support substrate to which the first polymer film is bonded; and
 a second substrate including:
  a fixed substrate having a second hole at a position corresponding to the first hole of the support substrate; and
  a second polymer film, which is bonded to a surface of the fixed substrate on the X-ray incident side so as to cover the second hole,
 the second substrate being bonded to the first substrate with the adhesive layer.

2. The sample holder for an X-ray fluorescence spectrometer according to claim 1, wherein the fixed substrate has flexibility.

3. The sample holder for an X-ray fluorescence spectrometer according to claim 2, wherein the fixed substrate is thinner than the support substrate.

4. The sample holder for an X-ray fluorescence spectrometer according to claim 1, wherein the adhesive layer configured to bond the first substrate and the second substrate to each other is formed of a laminate including a bonding agent, a third polymer film, and the bonding agent.

5. The sample holder for an X-ray fluorescence spectrometer according to claim 4, wherein the third polymer film is made of a foam.

6. The sample holder for an X-ray fluorescence spectrometer according to claim 1, wherein the X-ray fluorescence spectrometer comprises a tube-above optics X-ray fluorescence spectrometer.

7. The sample holder for an X-ray fluorescence spectrometer according to claim 1, wherein the support substrate and the fixed substrate have different colors.

8. The sample holder for an X-ray fluorescence spectrometer according to claim 1, wherein the first polymer film and the second polymer film are each made of one or more of a polypropylene, a polyester, and a polyimide.

9. A sample holder manufacturing jig, which is configured to manufacture the sample holder for an X-ray fluorescence spectrometer of claim 1,
 the sample holder manufacturing jig comprising:
  a flat plate portion, which has an outer shape in plan view conforming to a part of an outer shape of the first substrate, and on which the first substrate is mounted; and
  a guide portion, which is configured to fix the first substrate, and is arranged so as to extend along an edge of a part corresponding to the outer shape and stand with respect to a surface of the flat plate portion on which the first substrate is mounted.

10. The sample holder manufacturing jig according to claim 9, wherein the flat plate portion includes an indicator for indicating an outer edge of the first hole of the support substrate.

11. The sample holder manufacturing jig according to claim 9, wherein the sample holder manufacturing jig is made of polyethylene terephthalate.

12. A method of producing a sample for an X-ray fluorescence spectrometer, comprising:
 dropping a liquid sample onto a recessed portion defined by a first hole and a first polymer film of a first substrate, the recessed portion being a part of the first substrate, and the first substrate including a support substrate having the first hole, the first polymer film that is bonded to a surface of the support substrate on an X-ray incident side so as to cover the first hole, and an adhesive layer which is provided on a back surface of the surface of the support substrate to which the first polymer film is bonded; and
 bonding a second substrate to the first substrate with the adhesive layer, the second substrate including a fixed substrate having a second hole at a position corresponding to the hole of the support substrate and a second polymer film that is bonded to a surface of the fixed substrate on the X-ray incident side so as to cover the second hole.

13. The method of producing a sample for an X-ray fluorescence spectrometer according to claim 12, further comprising mounting the first substrate on a sample holder manufacturing jig,
 the sample holder manufacturing jig including:
  a flat plate portion, which has an outer shape in plan view conforming to a part of an outer shape of the first substrate, and on which the first substrate is mounted; and
  a guide portion, which is configured to fix the first substrate, and is arranged so as to extend along an edge of a part corresponding to the outer shape and stand with respect to a surface of the flat plate portion on which the first substrate is mounted.

* * * * *